United States Patent [19]

Oishi

[11] Patent Number: 4,844,378
[45] Date of Patent: Jul. 4, 1989

[54] MAGNETIC TAPE CASSETTE HAVING IMPROVED ERASURE PREVENTING DEVICE

[75] Inventor: Kengo Oishi, Kanagawa, Japan

[73] Assignee: Fuji Photo Film Co., Ltd., Kanagawa, Japan

[21] Appl. No.: 247,011

[22] Filed: Sep. 21, 1988

[30] Foreign Application Priority Data

Sep. 21, 1987 [JP] Japan .............................. 62-143015[U]

[51] Int. Cl.$^4$ ............................................... G11B 23/04
[52] U.S. Cl. ..................................... 242/199; 360/60; 360/132
[58] Field of Search ............................... 242/197–199; 360/60, 132, 137

[56] References Cited

U.S. PATENT DOCUMENTS

| | | | |
|---|---|---|---|
| 4,320,422 | 3/1982 | Rinkleib | 360/132 X |
| 4,348,707 | 9/1982 | Maly et al. | 360/60 X |
| 4,399,481 | 8/1983 | Loranger et al. | 360/132 |

FOREIGN PATENT DOCUMENTS 28256 8/1980 Japan .

*Primary Examiner*—David Werner
*Attorney, Agent, or Firm*—Sughrue, Mion, Zinn, Macpeak & Seas

[57] ABSTRACT

A magnetic tape having an improved mistake erasure preventing device. A cylindrical body is rotatably mounted in a rear corner of the body of the cassette. The rotational axis of the cylindrical body is arranged in any of the directions of thickness, width and length of the cassette body. The cylindrical body has portions colored with conspicuous and inconspicuous colors corresponding to recordable and unrecordable states of the cassette and a hole which is aligned with a hole in the cassette body in one rotational position of the cylindrical body through which a detector of the recording/playback apparatus is insertable to detect the recordable state of the cassette. Holes are provided in the rear and side walls of the cassette body through which the colored portions of the cylindrical body are observable to visually determine the recordable state of the cassette.

5 Claims, 1 Drawing Sheet

MAGNETIC TAPE CASSETTE HAVING IMPROVED ERASURE PREVENTING DEVICE

BACKGROUND OF THE INVENTION

The present invention relates to a magnetic tape cassette, particularly to a magnetic tape cassette having an improved mistake erasure preventing device by which a "recordable" mode or an "unrecordable" mode can be established for the cassette.

A magnetic tape cassette is usually provided with an mistake erasure preventing device with which either a mode of making it possible to record information on the magnetic tape in the cassette or a mode of making it impossible to record information thereon is set. For example, if a magnetic tape cassette has information recorded on the magnetic tape which is desired to be retained for a long period of time, the mistake erasure preventing device is manipulated to prevent the mistake erasure of the tape.

Various conventional mistake erasure preventing devices are known. In one such device, a break-out tab is provided in an appropriate position on the outside surface of the body of the magnetic tape cassette in such a manner that the tab can be removed to expose a detection hole. In another arrangement, a slidable or rotatable member is manipulated to expose a detection hole in the outside surface of the magnetic tape cassette. The recording/playback apparatus is set in the appropriate mode by a detector movable into the detection hole, as disclosed in Japanese Utility Model Application No. 38181/79 and Japanese Unexamined Published Utility Model Applications Nos. 98289/86 and 28256/80.

However, these conventional mistake erasure preventing devices have a problem that it is often difficult to quickly determine whether or not the cassette is in the "re-recordable". Even if the magnetic tape cassette is provided with an indicator which makes it easy to see whether or not the magnetic tape cassette is in the "re-recordable" mode, the cassette has a problem that the indicator cannot be easily seen in some position of the cassette.

SUMMARY OF THE INVENTION

The present invention made in order to solve the above-mentioned problems.

Accordingly, it is an object of the present invention to provide a magnetic tape cassette constituted so that it can be very easily recognized what state an mistake erasure preventing device is in.

In accordance with the above and other objects, a magnetic tape cassette in accordance with the present invention comprises a pair of tape winders on which a magnetic tape is wound; and mistake erasure preventing means for detecting and indicating whether it is possible or impossible to perform recording on the magnetic tape in the cassette. The magnetic tape cassette is characterized in that the mistake erasure preventing means includes a cylindrical body rotatably supported in a rear corner of the cassette and having a hole which can be aligned with a detection hole into which the detector of a recording/playback apparatus can be inserted, openings through which a portion of the means can be seen are provided in a least the rear and side of the cassette body at the rear corner thereof, and the state of manipulation of the mistake erasure preventing means can be recognized through the openings.

DESCRIPTION OF THE PREFERRED EMBODIMENTS

Preferred embodiments of the present invention are hereafter described with reference to the attached drawings.

Figure 1:
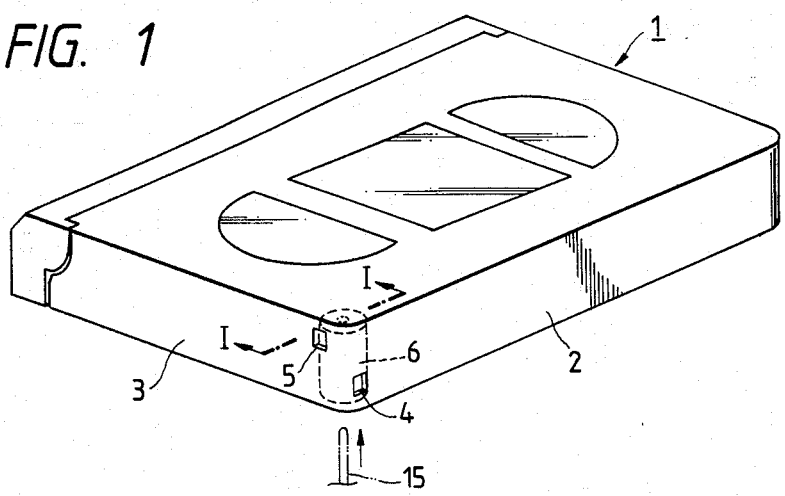
FIG. 1 shows a perspective view of a video tape cassette constructed according to the present inventions.
Figure 2:
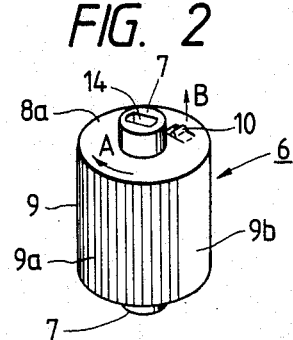
FIG. 2 shows a perspective view of a major part of the video tape cassette of FIG. 1.
Figure 3:
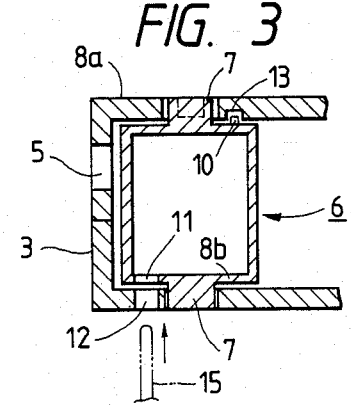
FIG. 3 shows a cross-sectional view of the video tape cassette taken along a line I—I in FIG. 1.

FIG. 1 shows a perspective view of a video tape cassette 1 constructed in accordance with the invention. FIG. 2 shows a perspective view of an mistake erasure prevention device 6 provided in the video tape cassette 1. FIG. 3 shows a sectional view of the video tape cassette 1 taken along a line I—I in FIG. 1.

As shown in FIG. 1, the mistake erasure preventing device 6 is rotatably fitted in a rear corner of the cassette, and openings 4 and 5, through which the cylindrical outside surface 9 of the mistake erasure preventing device can be seen, are provided in the rear 2 of the body of the cassette and a side 3 of the body thereof, respectively. As shown in FIG. 2, the mistake erasure preventing device 6 is formed with a cylindrical body. Rotary shafts 7 project from the upper end face 8a and lower end face 8b of the cylindrical body. The upper end face 8a of the cylindrical body is provided with an engaging projection 10 which is elastic in a vertical direction B. The lower end face 8b of the cylindrical body is provided with a hole 11. The mistake erasure preventing device 6 can be rotated about the rotary shafts 7. The cylindrical outside surface 9 of the mistake erasure preventing device 6 is appropriately divided into a conspicuously colored portion 9a painted in a relatively conspicuous color, and an inconspicuously colored portion 9b painted in a relatively inconspicuously color. As shown in FIG. 3, the rotary shafts 7 are fitted in the upper and lower portions of the body of the video tape cassette 1 so that the mistake erasure preventing device 6 can be rotated.

To prevent a recording on the video tape in the cassette 1 from being unintentionally erased, the mistake erasure preventing device 6 is manipulated by turning the rotary shaft 7 manually or by inserting a screwdriver or the like into the recess 14 of the rotary shaft and turning the screwdriver or the like in the direction of an arrow A in FIG. 2 to align the hole 11 of the device and the detection hole 12 in the lower portion of the body of the cassette with each other. Since the hole 11 of the mistake erasure preventing device 6 and the detection hole 12 of the body of the video tape cassette 1 are thus aligned with each other, the detector 15 of the recording/playback apparatus can be inserted into the cassette to place the apparatus in the "unrecordable" mode. When the hole 11 of the device 6 and the detection hole 12 of the cassette 1 are aligned with each other, the position of the conspicuously colored portion 9a of the cylindrical outside surface 9 of the device coincides with those of the openings 4 and 5 of the body of the cassette to indicate that it is impossible to perform recording. At the same time, the engaging projection 10 on the upper end face 8a of the body of the device 6 engages the recess 13 of the upper portion of the body of the cassette 1 to hold the device 6 in the "unrecordable" position.

When recording is to be permitted on the video tape in the cassette 1, the mistake erasure preventing device 6 is appropriately turned so that the detection hole 12 of the body of the cassette is closed by the lower end face 8b of the body of the device. At that time, the device 6 is held in place by the engaging projection 10 engaging the other engaging recess (not shown in the drawings) in the upper portion of the body of the cassette 1. In this position, the inconspicuously colored portion 9b of the cylindrical outside surface 9 of the device coincides with the openings 4 and 5 of the body of the cassette to indicate that it is possible to perform recording with the cassette.

Since it is indicated through the opening 4 in the rear 2 of the body of the video tape cassette 1 and the opening 5 in the side 3 of the body thereof whether or not it is possible to perform recording, the recording/non-recording indication can be seen without taking the cassette out of its container as long as the cassette is stored in such a position in the container that at least one of the rear 2 and side 3 of the body of the cassette is visible.

The present invention is not confined to the above-described embodiment, and it may be embodied in other various ways. For example, an indicating opening may be provided in the upper portion of the body of the video tape cassette in addition to the openings in the rear and side of the body of the cassette.

Figure 4:
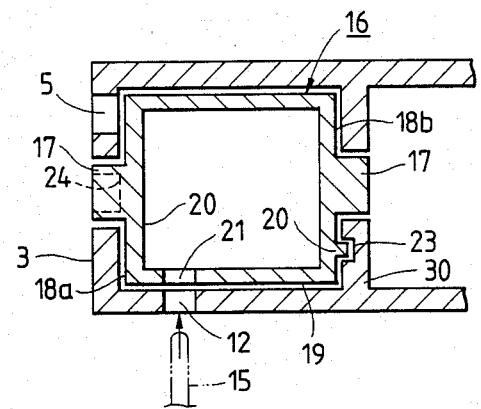
FIG. 4 shows a sectional view of a major part of a video tape cassette constructed according to another embodiment of the invention.

FIG. 4 shows a sectional view of an mistake erasure preventing device 16 of a video tape cassette constructed according to a further embodiment of the invention. The embodiment of FIG. 4 includes the same opening 4 (not shown in FIG. 4) as in the above-described embodiment and another opening 5. The mistake erasure preventing device 16, which is provided in the body of the video tape cassette, is shaped cylindrically. The device 16 is mounted in the body of the cassette in such a manner that the rotational axis of the device extends in the longitudinal direction of the cassette, that is, perpendicular to the rotational axis in the mistake erasure preventing device 6 of the video tape cassette 1 shown in FIGS. 1, 2 and 3. Thus, the axes of rotary shafts 17 provided on the two end faces 18a and 18b of the body of the mistake erasure preventing device 16 extend in the longitudinal direction of the video tape cassette. One of the rotary shafts 17, which has a recess 24, is exposed at a side 3 of the body of the video tape cassette. The end face 18b of the body of the mistake erasure preventing device 16 is provided with an engaging projection 20, which is received in an engaging recess 23 formed in a partition wall 30. The circumferential portion of the mistake erasure preventing device 16 has a hole 21, which can be aligned with the detection hole 12 in the body of the video tape cassette. The cylindrical outside surface 19 of the body of the mistake erasure preventing device 16 is appropriately divided into a conspicuously colored portion and an inconspicuously colored portion, the position of one of which coincides with that of the opening 4 (not shown in FIG. 4) in the rear of the body of the video tape cassette. The end face 18a, which faces the opening 5 in the side 3 of the body of the cassette, is also appropriately divided into a conspicuously colored portion and an inconspicuously colored portion. With this construction, it can be clearly indicated through the rotation of the mistake erasure preventing device 16, similar to the preceding embodiment, whether or not it is possible to perform recording with the video tape cassette.

Since the rotary shafts 17 of the mistake erasure preventing device 16 can be positioned entirely in the lower half portion of the body of the video tape cassette in fitting the device to the cassette, the ease of assembly of the cassette is improved.

Although in the embodiment of FIG. 4 the mistake erasure preventing device 16 is fitted in the body of the video tape cassette in such a manner that the axes of the rotary shafts 17 extend in the longitudinal direction of the cassette, the device may be mounted in the body of the cassette in such a manner that the axes of the rotary shafts extend in the transverse direction of the cassette.

Although the above-described embodiments are video tape cassettes, the present device is not confined thereto but may be embodied as a different type of magnetic tape cassette, magnetic disk cartridge or the like.

According to the present invention, the mistake erasure preventing device for a magnetic tape cassette can be rotated to place the cassette in a "recordable" mode or an "unrecordable" mode very easily and repeatedly and to indicate clearly at both the side and rear of the body of the cassette whether or not it is possible to perform recording with in the cassette. For that reason, it is easy to recognize whether the cassette is recordable or not. If the cassette is stored in a container so that at least one of the side and rear of the body of the cassette is visible, such recognition can be performed without taking the cassette out of the container.

What is claimed is:

1. A magnetic tape cassette comprising: a cassette body having a detection hole formed therein into which a detector of a recording/playback apparatus can be inserted to determine whether the cassette is recordable; a pair of tape winding bodies on which a magnetic tape is wound rotatably dispose in said cassette body; and mistake erasure preventing means for detecting and indicating whether it is possible or impossible to perform recording on said tape, said mistake erasure preventing means comprising a cylindrical body rotatably supported in a rear corner of said cassette, said cylindrical body having a hole which can be aligned with said detection hole in said cassette body, openings, through which a portion of said cylindrical body can be seen, being provided in a least rear and side walls of said cassette at said rear corner; and marks provided on said cylindrical body viewable through said openings.

2. The magnetic tape cassette according to claim 1, wherein said cylindrical body comprises rotary shafts whose axes extend in a direction of thickness of said cassette, said marks comprising portions which differ from each other in color, a position of each of said portions coinciding with said openings in respective rotational position of said cylindrical body, and said hole in said cylindrical body being provided in an end face of said cylindrical body.

3. The magnetic tape cassette according to claim 1, wherein said cylindrical body comprises rotary shafts whose axes extend in a direction of one of length and width of said cassette, said marks comprising portions of different color provided respectively on an surface and end face of said cylindrical body, a position of each of said portions coinciding with those of said openings in respective rotational positions of said cylindrical body, and said hole in said cylindrical body being provided in said cylindrical outside surface.

4. The magnetic tape cassette of claim 1, further comprising means for retaining said cylindrical body in respective positions corresponding to said cassette being recordable and said cassette being unrecordable.

5. The magnetic tape cassette of claim 4, wherein said detent means comprises an elastic engaging projection formed on said cylindrical body and a pair of engaging holes formed in said cassette body.

* * * * *